(12) United States Patent
Meng et al.

(10) Patent No.: US 7,652,985 B2
(45) Date of Patent: Jan. 26, 2010

(54) SYSTEM AND METHOD OF DATA TRANSMISSION AND METHOD OF SELECTING COMMUNICATION PATH FOR DUAL-CONTROLLER SYSTEM

(75) Inventors: Xiang-Bin Meng, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 589 days.

(21) Appl. No.: 11/708,490

(22) Filed: Feb. 21, 2007

(65) Prior Publication Data
US 2008/0198846 A1     Aug. 21, 2008

(51) Int. Cl.
G01R 31/08 (2006.01)
G06F 11/00 (2006.01)
H04J 3/06 (2006.01)

(52) U.S. Cl. ........................... 370/220; 370/507
(58) Field of Classification Search ................ None
See application file for complete search history.

(56) References Cited

U.S. PATENT DOCUMENTS 7,006,431 B1 * 2/2006 Kanekar et al. ........... 370/217
7,460,470 B2 * 12/2008 McGee et al. ............. 370/218
2005/0281190 A1 * 12/2005 McGee et al. ............. 370/216

* cited by examiner

Primary Examiner—Chirag G Shah
Assistant Examiner—Ashley L Shivers
(74) Attorney, Agent, or Firm—Rabin & Berdo, P.C.

(57) ABSTRACT

A data transmission system and method and a method of selecting a communication path for a dual-controller system are provided, which are applied in a first controller and a second controller of the dual-controller system. First of all, a corresponding transmission medium is selected according to a feature of a data request issued by a controller, then the data request is converted into a data format compatible with a medium interface corresponding to the selected transmission medium and is sent to a corresponding medium driving portion connected with the medium interface, and the data request is sent to another controller through the medium driving portion and a connected corresponding medium controller, so as to select a path of the highest transmission performance, and realize the data transmission between the two controllers.

11 Claims, 3 Drawing Sheets

SYSTEM AND METHOD OF DATA TRANSMISSION AND METHOD OF SELECTING COMMUNICATION PATH FOR DUAL-CONTROLLER SYSTEM

BACKGROUND OF THE INVENTION

1. Field of Invention

The present invention relates to a method of transmitting data between controllers, and more particularly to, a system and a method of transmitting data between two controllers of a dual-controller system.

2. Related Art

Usually, a dual-controller system is applied in an environment having a high requirement on the completeness of data and the continuity of service, e.g., a storage area network (SAN). The function of the dual-controller system lies in that, when one of the controllers is taken as a server, i.e., when the main server is providing a service, the other controller is taken as a mirror backup server of the main server. Therefore, when the main server is down and cannot continue to provide services, the backup server takes over the services of the main server, so as to ensure the completeness of data and the continuity of services.

Therefore, it is necessary to establish an internal communication link between the two controllers of the dual-controller system, e.g., Ethernet card interconnection, for transmitting data, so as to keep the synchronization of the two controllers. Sometimes, a plurality of links for providing the internal communication mechanism may exist in the dual-control system at the same time, e.g., an optical fiber interface or an Ethernet interface etc. However, due to the differences of the transmission media and protocol standards of the links, the performances of transmitting different types of data packets are different. For example, communication links having high transmission frequencies but small maximum transmission units are suitable for transmitting data packets of a small scale. On the other hand, the performance of communication links having low transmission frequencies but large maximum transmission units is obvious during the transmission of large block data.

Therefore, the conventional internal communication link of a single path is limited by the transmission medium, and is only suitable for the data in a certain data packet scale range. Once a data packet exceeding the range is transmitted, the performance will be reduced. Moreover, when the scale of the transmitted data keeps changing, the transmitting performance will greatly fluctuate correspondingly.

SUMMARY OF THE INVENTION

In order to solve the problems and defects of the conventional art, the present invention is directed to a system and a method of data transmission and a method of selecting a communication path for a dual-controller system, which are used for selecting an appropriate internal communication link of data transmission, so as to improve the performance of the data transmission.

The data transmission system of a dual-controller system provided by the present invention is applied in communication between a first controller and a second controller of the dual-controller system. The data transmission system includes an internal communication module, a data routing layer, a medium interface layer, and a medium driving layer. The internal communication module issues a corresponding data request of the first/second controller, so as to transmit a data packet of a certain size to the second/first controller. The data routing layer receives the data request issued by the internal communication module, and selects a transmission medium according to a size feature of the data packet requested to transmit. The medium interface layer includes a plurality of medium interfaces, receives the data request and allocates the data request to a medium interface corresponding to the selected transmission medium, and converts the data request into a data format compatible with the medium interface and sends to a corresponding medium driving portion. The medium driving layer includes a plurality of medium driving portions, and the data request is received by the corresponding medium driving portion, and is sent to the second/first controller through a corresponding medium controller.

As for the data transmission system of a dual-controller system of the present invention, the data routing layer selects the transmission medium according to a throughput of the data packet transmitted by the transmission medium. Moreover, the transmission medium having a higher throughput when transmitting the data packet of this size is selected to transmit. When a plurality of transmission media has the same or similar throughput for the transmitted data packet, the transmission medium having a lower CPU rate among the plurality of transmission media is selected.

The data transmission method of a dual-controller system provided by the present invention is applied in data transmission between a first controller and a second controller of the dual-controller system, and includes the following steps: receiving a data request issued by a communication system of the first/second controller, and selecting a corresponding transmission medium according to a size feature of the data packet requested to transmit; converting the data request into a data format compatible with a medium interface corresponding to the selected transmission medium, and sending to a corresponding medium driving portion connected with the medium interface; using the medium driving portion to control a corresponding medium controller connected therewith, so as to send the data request to a corresponding medium controller connected with the medium controller in the second/first controller; using the medium controller of the second/first controller to send the data request to a corresponding medium driving portion connected therewith; using the medium driving portion to receive the data request and send to a corresponding medium interface connected therewith; and the medium interface extracting the data in the received data request, and transmitting the data to the communication system of the second/first controller.

As for the data transmission method of the dual-controller system provided by the present invention, the medium having a higher throughput of the transmitted data packet among the plurality of transmission media is selected as the transmission medium. When a plurality of transmission media has the same or similar throughput for the transmitted data packet, the transmission medium having a lower CPU rate among the plurality of transmission media is selected to transmit the data packet. The CPU rate is a rate when the plurality of transmission media is performing a full load transmission.

Moreover, the present invention also provides a method of selecting a communication path for a dual-controller system, which is applied in internal communication between two controllers of the dual-controller system, and includes the following steps: obtaining a size of a transmitted data packet of a data request according to the data request issued by one of the controllers in the dual-controller system; calculating a throughput of the data packet transmitted by different transmission media in the controller according to a size of the data packet; selecting the transmission medium having the highest throughput among different transmission media; and sending the transmitted data packet of the data request to the selected transmission medium, so as to transmit the data request for the internal communication of the two controllers.

The present invention compares the throughputs of the data packet of this size transmitted by different media through a routing algorithm according to the data feature of the system transmission request (i.e., the size of the transmitted data packet), so as to select a path of the highest transmission performance. Therefore, multiple communication links existing in the system are used in a complementary way, and an appropriate communication link is selected for the data packets of different sizes, so as to achieve and stabilize the optimization of the transmission performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Features and examples of the preferred embodiment of the present invention are illustrated below in detail with reference to the drawings.

Figure 1:
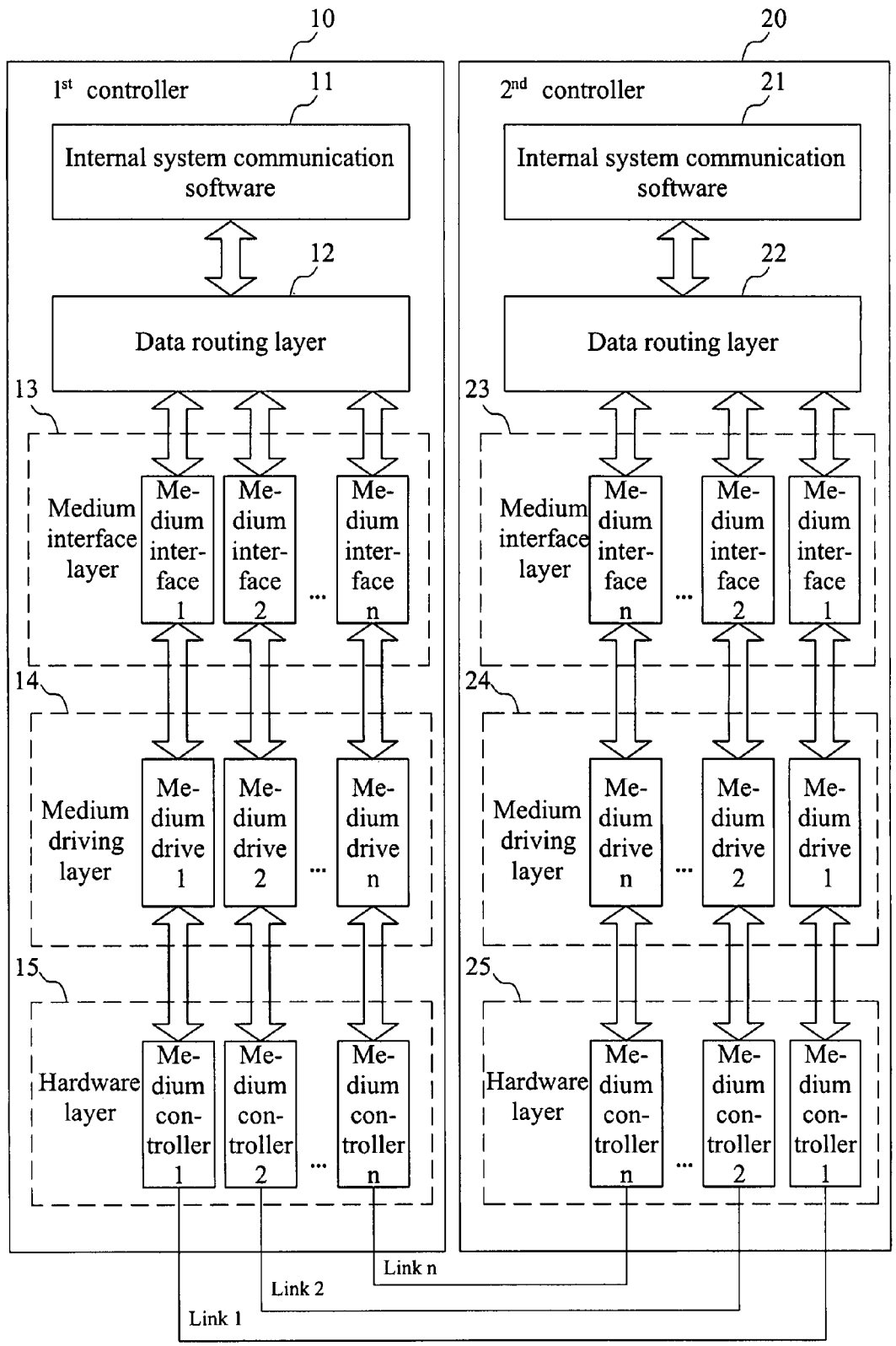
FIG. 1 is a system block diagram of a data transmission system of a dual-controller system of the present invention.

FIG. 1 is a system block diagram of a data transmission system of a dual-controller system of the present invention. Referring to FIG. 1, the dual-controller system includes a first controller 10 and a second controller 20, which have an internal communication link different from that of a single path of the conventional dual-controller system, and respectively include a data routing layer and a medium interface layer. The architecture of the data transmission system of the present invention is illustrated below in detail with reference to FIG. 1.

On one hand, the data routing layer 12 of the first controller 10 receives a data request issued by an internal system communication software 11, and allocates the request to an appropriate medium interface in the medium interface layer 13 according to feature of the request. On the other hand, the data routing layer 12 receives the data request transmitted from the medium interface layer, and sends to the internal system communication software 11 for conducting a corresponding data request transmission.

The medium interface layer 13 has a plurality of medium interfaces connected with various medium drives of a medium driving layer 14 correspondingly. One end of each controller of different media in a hardware layer 15 is connected with the corresponding medium drive in the medium driving layer 14, and the other end is connected with the corresponding medium controller in the hardware layer 25 of the second controller 20 through a plurality of links. The connection relationship among a medium driving layer 24, a medium interface layer 23, a data routing layer 22, and an internal system communication software 21 in the second controller 20 is similar to the corresponding components in the first controller 10, and is not repeated in detail here.

On one hand, the medium interface layer 13 receives the data request issued by the data routing layer 12, and converts the data request into a data format compatible with the corresponding medium, so as to send to the medium drive connected with the selected medium interface in the medium driving layer 14. On the other hand, the medium interface layer 13 receives the data request transmitted from the corresponding medium driving portion, extracts valid data therein, and sends to the data routing layer 12.

The data routing layer 12 selects an appropriate medium interface according to the size feature of the data packet requested to transmit, and in detail, the throughputs of the data packet of this size transmitted by different media in the system are compared, and the medium having a largest throughput has a highest performance when transmitting the data packet of this size. Thus the medium interface corresponding to the transmission medium having a large throughput is selected to obtain the optimal transmission path.

Some parameters are defined below for determining the calculation equation of the throughput of the medium. CPT is a throughput of the data packet transmitted by different media, and MTP is a maximum throughput of different media, i.e., the total data amount that a medium can transmit in a unit time, which is a unit of byte per second (Bps). The throughput of a full duplex medium is twice as much as that of a simplex medium. IOPS is a transmission frequency of the medium, which is the input/output times accomplished on the medium in a unit time, and is in a unit of input/output times per second (IOps). This parameter is related to physical characteristics of the medium, and can be obtained through a test method. For example, when other software and services are not running in the system, the data packet having a size of the maximum transmission unit of the medium is continuously transmitted. After an hour, the input/output times during this period of time are acquired, and are divided by 3600, so as to obtain the transmission frequency of the medium. Moreover, PS is a size of the data packet, which is in a unit of byte. MTU is a maximum transmission unit of the medium, which is in a unit of byte.

When the data packet of a certain size is transmitted on a certain medium, affected by the maximum transmission unit of the medium, the data packet is divided into (PS−1)/MTU+1 input/output units (an exact division here). Since the medium transmission frequency is IOPS, the number of the data packet with a size of PS transmitted per second is IOPS/((PS−1)/MTU+1). Therefore, the current throughput is IOPS×PS/((PS−1)/MTU+1). The calculated throughput may exceed MTP, while in fact, affected by the medium transmission rate, the highest current throughput is no higher than MTP. Therefore, the calculation equation of the transmission throughput of the medium is: CTP=min(MTP, IOPS×PS/((PS−1)/MTU+1)).

Moreover, when it is calculated that a plurality of the transmission media has the same or similar throughput for the data packet of a certain size, i.e., when the difference between the calculated transmission throughputs of the media is less than 64 KB (kilobyte), the data routing layer 12 selects the one having a lower CPU rate as the transmission medium, so as to reduce the CPU rate and improve the overall performance of system. Here, the CPU rate is a rate when the plurality of transmission media is performing a full load transmission.

Likewise, the functions of the data routing layer 22 and the medium interface layer 23 of the second controller 20 are similar to the data routing layer 12 and the medium interface layer 13 of the first controller 10.

Figure 2:
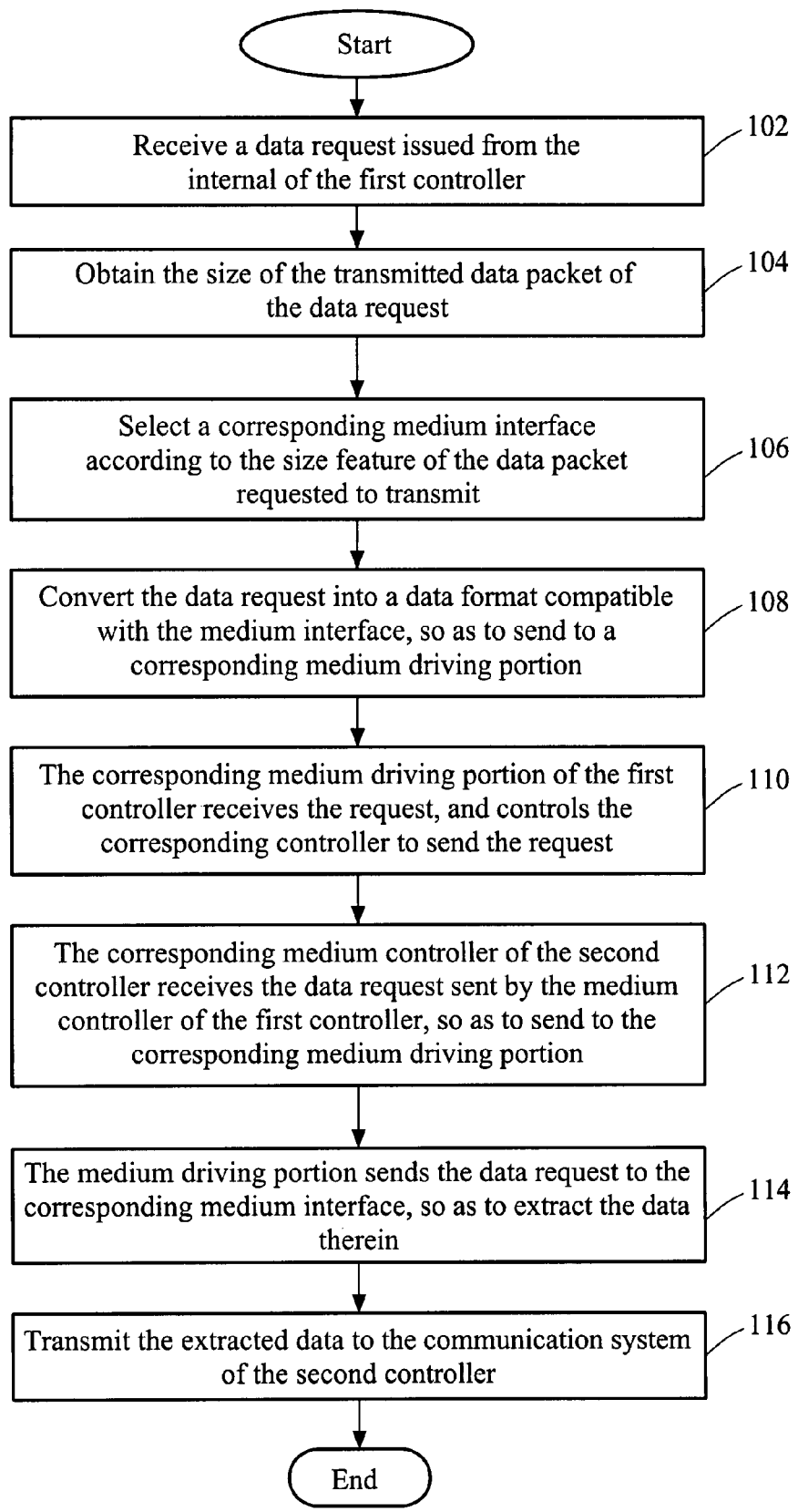
FIG. 2 is a flow chart of the steps of a data transmission method of the dual-controller system of the present invention.

FIG. 2 is a flow chart of the steps of a data transmission method of the dual-controller system according to an embodiment of the present invention. Referring to FIG. 2, the data transmission embodiment of this figure is about sending the data from the first controller to the second controller of the dual-controllers system, and the flow will be the same for the opposite transmission direction.

According to this embodiment, the data transmission method of the present invention includes the following steps: receiving a data transmission request issued from the internal of the first controller system (Step 102), obtaining the size of the transmitted data packet from the request (Step 104), selecting an appropriate transmission medium according to the size feature of the data packet, and sending the data request to the medium interface corresponding to the selected interface (Step 106). The corresponding medium interface receives the data request, converts the request into a data format compatible with the medium interface, and sends to the corresponding medium driving portion (Step 108). However, after the medium driving portion of the first controller receives the request, the corresponding medium controller is controlled to send the request to the second controller (Step 110). The medium controller in the second controller connected with the medium controller in the first controller receives the request, and transmits to the corresponding connected medium driving portion (Step 112). Then, the medium driving portion sends the data request to the corresponding connected medium interface, so as to extract the valid data therein (Step 114). At last, the corresponding medium interface of the second controller sends the valid data extracted from the request to the system communication software corresponding to the second controller (Step 116).

Figure 3:
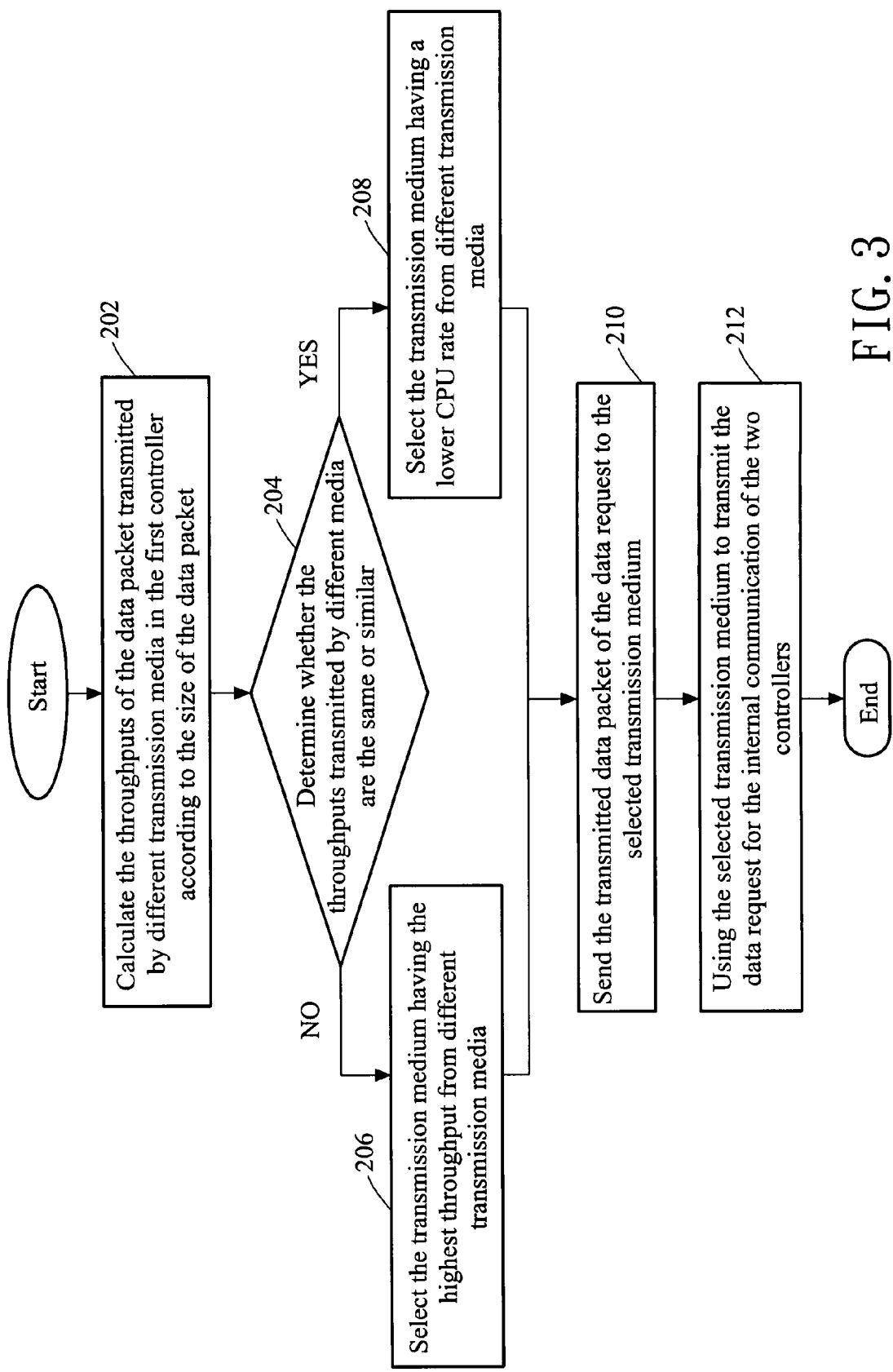
FIG. 3 is a flow chart of the steps of the algorithm of selecting the transmission path of the data packet of the present invention.

The detailed steps of the algorithm of selecting the appropriate transmission medium according to the size of the transmitted data packet are given in FIG. 3, which is a flow chart of the steps of the algorithm of selecting the transmission path of the data packet of the present invention. First of all, the throughputs of the data packet transmitted by different transmission media in the first controller are calculated according to the size of the data packet (Step 202). The calculation equation of the throughput is: CTP=min(MTP, IOPS×PS/((PS−1)/MTU+1)), where CTP is a throughput of the data packet transmitted by different transmission media, MTP is a maximum throughput of different transmission media, IOPS is a transmission frequency of the transmission medium, PS is a size of the data packet, and MTU is a maximum transmission unit of the transmission medium.

Then, whether the transmission throughputs of the data packet of different media are the same or similar is determined according to the calculated throughput (Step 204), in which the medium transmission throughputs can be determined to be similar if the difference is less than 64 KB (kilobyte). When it is determined to be the same or similar, the one having a lower CPU rate among different transmission media is selected as the transmission medium (Step 208); otherwise, the medium having the highest throughput therein is selected as the transmission medium of the data packet (Step 206). After an appropriate transmission medium is selected, the transmitted data packet of the data request is sent to the selected transmission medium (Step 210), and the data request is transmitted through the corresponding interface of the transmission medium for the internal communication of the two controllers (Step 212).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transmission system of a dual-controller system, applied in a communication between a first controller and a second controller of the dual-controller system, the data transmission system comprising:

an internal communication module, issuing a corresponding data request of the first controller/the second controller, so as to transmit a data packet of a certain size to the second controller/the first controller;

a data routing layer, receiving the data request issued by the internal communication module, and selecting a transmission medium according to a size feature of the data packet requested to transmit and according to a throughput of the data packet transmitted by the transmission medium;

a medium interface layer, comprising a plurality of medium interfaces, receiving the data request and allocating the data request to a medium interface corresponding to the selected transmission medium, and converting the data request into a data format compatible with the medium interface and sending to a corresponding medium driving portion; and a medium driving layer, comprising a plurality of medium driving portions, wherein the data request is received by the corresponding medium driving portion of the medium driving layer, and is sent to the second controller/the first controller through a corresponding medium controller.

2. The data transmission system as claimed in claim 1, wherein the data routing layer selects the transmission medium having a higher throughput among a plurality of transmission media to transmit the data packet.

3. The data transmission system as claimed in claim 2, wherein when the plurality of transmission media has the same or similar throughput for the transmitted data packet, the transmission medium having a lower CPU rate among the plurality of transmission media is selected to transmit the data packet, wherein the CPU rate is a rate when the plurality of transmission media is performing a full load transmission.

4. The data transmission system as claimed in claim 3, wherein a calculation equation of the throughput of the data packet transmitted by the transmission medium is:

CTP=min(MTP, IOPS×PS/((PS−1)/MTU+1)), wherein CTP is the throughput of the data packet transmitted by the transmission medium, MTP is a maximum throughput of the transmission medium, IOPS is a transmission frequency of the transmission medium, PS is the size of the data packet, and MTU is a maximum transmission unit of the transmission medium.

5. A data transmission method of a dual-controller system, applied in a communication between a first controller and a second controller of the dual-controller system, the data transmission method comprising:

receiving a data request issued by a communication system of the first controller/the second controller, and selecting a corresponding transmission medium according to a size of a data packet requested to transmit and according to a throughput of the data packet transmitted by the transmission medium;

converting the data request into a data format compatible with a corresponding medium interface of the transmission medium, and sending to a corresponding medium driving portion connected with the medium interface;

using the medium driving portion to control a corresponding medium controller connected therewith, so as to send the data request to a corresponding medium controller connected with the medium controller in the second controller/the first controller;

using the medium controller of the second controller/the first controller to send the data request to a corresponding medium driving portion connected therewith;

using the medium driving portion to receive the data request and sending to a corresponding medium interface connected therewith; and the medium interface extracting data in the received data request, and transmitting the data to the communication system of the second controller/the first controller.

6. The data transmission method as claimed in claim 5, wherein the transmission medium having a higher throughput among a plurality of transmission media is selected to transmit the data packet.

7. The data transmission method as claimed in claim 6, wherein when the plurality of transmission media has the same or similar throughput for the transmitted data packet, the transmission medium having a lower CPU rate among the plurality of transmission media is selected to transmit the data packet, wherein the CPU rate is a rate when the plurality of transmission media is performing a full load transmission.

8. The data transmission method as claimed in claim 7, wherein a calculation equation of the throughput of the data packet transmitted by the transmission medium is:

CTP=min(MTP, IOPS×PS/((PS−1)/MTU+1)), wherein CTP is the throughput of the data packet transmitted by the transmission medium, MTP is a maximum throughput of the transmission medium, IOPS is a transmission frequency of the transmission medium, PS is the size of the data packet, and MTU is a maximum transmission unit of the transmission medium.

9. A method of selecting a communication path for a dual-controller system, applied in selecting a transmission medium of a data transmission communication path of the dual-controller system, the method comprising:

obtaining a size of a transmitted data packet of a data request according to the data request issued by one of the controllers of the dual-controller system;

calculating a throughput of the data packet transmitted by different transmission media in the controller that issued the data request according to the size of the data packet;

selecting the transmission medium having a highest throughput among the different transmission media;

sending the transmitted data packet of the data request to the selected transmission medium, so as to transmit the data request for an internal communication between the two controllers;

converting the data request into a data format compatible with the selected transmission medium and sending the converted data request to a corresponding medium driving portion;

receiving the converted data request by the corresponding medium driving portion; and transmitting the converted data request received by the corresponding driving portion to one of the two controllers.

10. The method of selecting a communication path as claimed in claim 9, wherein when the different transmission media have the same or similar throughput for the transmitted data packet, the transmission medium having a lower CPU rate among the different transmission media is selected to transmit the data packet, wherein the CPU rate is a rate when the different transmission media are performing a full load transmission.

11. The method of selecting a communication path as claimed in claim 9, wherein a calculation equation of the throughput of the data packet transmitted by the transmission medium is:

CTP=min(MTP, IOPS×PS/((PS−1)/MTU+1)), wherein CTP is the throughput of the data packet transmitted by the transmission medium, MTP is a maximum throughput of the transmission medium, IOPS is a transmission frequency of the transmission medium, PS is the size of the data packet, and MTU is a maximum transmission unit of the transmission medium.

* * * * *